(12) United States Patent
Doggett et al.

(10) Patent No.: US 7,878,348 B2
(45) Date of Patent: Feb. 1, 2011

(54) ROBOTIC-MOVEMENT PAYLOAD LIFTER AND MANIPULATOR

(75) Inventors: William R. Doggett, Poquoson, VA (US); Bruce D. King, Yorktown, VA (US); Timothy J. Collins, Yorktown, VA (US); John T. Dorsey, Hampton, VA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 12/248,339

(22) Filed: Oct. 9, 2008

(65) Prior Publication Data

US 2009/0134107 A1    May 28, 2009

Related U.S. Application Data

(60) Provisional application No. 60/978,441, filed on Oct. 9, 2007, provisional application No. 61/093,760, filed on Sep. 3, 2008.

(51) Int. Cl.
*B66C 23/42* (2006.01)
(52) U.S. Cl. .................. 212/300; 212/239; 212/262
(58) Field of Classification Search ................ 212/298, 212/300, 239, 262
See application file for complete search history.

(56) References Cited

U.S. PATENT DOCUMENTS

| | | | |
|---|---|---|---|
| 1,108,029 A | 8/1914 | Tull | |
| 3,045,837 A | 7/1962 | Liebherr et al. | |
| 3,048,371 A | 8/1962 | Klimek, Jr. | |
| 3,083,837 A * | 4/1963 | Jones et al. | 212/295 |
| 3,314,488 A | 5/1964 | Brekelbaum et al. | |
| 3,198,345 A | 8/1965 | Brekelbaum et al. | |
| 3,285,445 A | 11/1966 | Broziat | |
| 3,306,468 A | 2/1967 | Pollack | |
| 3,402,824 A | 9/1968 | Zweifel | |
| 3,433,368 A * | 3/1969 | Durand | 212/295 |
| 3,685,668 A * | 8/1972 | Suverkrop | 212/289 |
| 4,068,827 A | 1/1978 | Fanning et al. | |

(Continued)

FOREIGN PATENT DOCUMENTS

DE    3223169 A1    12/1983

(Continued)

*Primary Examiner*—Michael R Mansen
*Assistant Examiner*—Juan J Campos
(74) *Attorney, Agent, or Firm*—Andrea Z. Warmbier; Robin W. Edwards

(57) ABSTRACT

A payload lifter/manipulator module includes a rotatable joint supporting spreader arms angularly spaced with respect to one another. A rigid arm is fixedly coupled to the joint and extends out therefrom to a tip. A tension arm has a first end and a second end with the first end being fixedly coupled to the tip of the rigid arm. The tension arm incorporates pivots along the length thereof. Each pivot can be engaged by or disengaged from the outboard end of a spreader arm based on a position of the spreader arm. A hoist, positioned remotely with respect to the module and coupled to the second end of the tension arm, controls the position of the spreader arms to thereby control the position of the rigid arm's tip. Payload lifter/manipulator assemblies can be constructed with one or more of the modules.

18 Claims, 5 Drawing Sheets

U.S. PATENT DOCUMENTS

| | | | |
|---|---|---|---|
| 4,381,060 A * | 4/1983 | Morrow et al. ............... 212/195 |
| 4,383,616 A | 5/1983 | Sterner et al. |
| 4,473,214 A | 9/1984 | Sterner et al. |
| 4,529,094 A | 7/1985 | Wadsworth |
| 4,738,583 A | 4/1988 | Macconochie et al. |
| 4,925,039 A | 5/1990 | Macris |
| 4,953,720 A | 9/1990 | Okano et al. |
| 5,253,771 A | 10/1993 | Mikulas, Jr. et al. |
| 5,263,809 A | 11/1993 | Kent |
| 5,445,487 A | 8/1995 | Koscinski, Jr. |
| D467,403 S | 12/2002 | Aquino |
| 6,499,610 B2 | 12/2002 | Spitsbergen |
| 6,640,928 B1 | 11/2003 | Ridley, Jr. |
| 6,655,539 B2 | 12/2003 | Bertinotti |
| 6,669,038 B1 | 12/2003 | Zingerman |
| 7,093,730 B2 | 8/2006 | Saint-Gerand |
| 7,114,682 B1 | 10/2006 | Kistler et al. |
| 7,216,774 B2 | 5/2007 | Mizuta et al. |
| 7,537,126 B2 * | 5/2009 | Kurotsu et al. ............... 212/300 |
| 2002/0023891 A1 | 2/2002 | Verchere et al. |
| 2003/0160016 A1 | 8/2003 | Ortiz et al. |
| 2003/0217985 A1 | 11/2003 | Saint-Gerand |
| 2004/0026350 A1 | 2/2004 | Yerly |

FOREIGN PATENT DOCUMENTS

| | | |
|---|---|---|
| SU | 504124 | 2/1976 |
| WO | WO 2007/008187 A2 | 1/2007 |

* cited by examiner

ROBOTIC-MOVEMENT PAYLOAD LIFTER AND MANIPULATOR

Pursuant to 35 U.S.C. §119, the benefit of priority from provisional application 60/978,441, with a filing date of Oct. 9, 2007, is claimed for this non-provisional application, and the specification thereof is incorporated in its entirety herein by reference.

ORIGIN OF THE INVENTION

This invention was made in part by employees of the United States Government and may be manufactured and used by or for the Government of the United States of America for governmental purposes without the payment of any royalties thereon or therefor.

BACKGROUND OF THE INVENTION

1. Field of the Invention

This invention relates to robotic manipulators. More specifically, the invention is a payload lifter and manipulator capable of robotic movements.

2. Description of the Related Art

A variety of devices are used for lifting, manipulating, and/or placing payloads. For Earth-based operations, conventional cranes are usually used to perform macro or over-land payload movements while fork-lifts (or other more easily manipulated devices) provide micro or on-land payload movements. However, lunar or planetary operations require more efficient device utilization. That is, lunar or planetary travel requires devices that can provide multiple functions, are readily transportable by a launch vehicle, and are readily assembled/configured for a variety of tasks.

SUMMARY OF THE INVENTION

Accordingly, it is an object of the present invention to provide an apparatus that can be used for both payload lifting and payload manipulation.

Another object of the present invention is to provide an apparatus that can lift a payload and precisely manipulate the payload using robotic-like movements.

Other objects and advantages of the present invention will become more obvious hereinafter in the specification and drawings.

In accordance with the present invention, a payload lifter/manipulator module and assemblies made from one or more modules are provided. Each module includes a rotatable joint that typically has at least first and second spreader arms angularly spaced with respect to one another and coupled to the joint for rotational movement therewith. Each of the spreader arms terminates at an outboard end thereof. A rigid arm is fixedly coupled to the joint and extends out therefrom to a tip. The rigid arm can rotate with the joint. A tension arm has a first end and a second end with the first end being fixedly coupled to the tip of the rigid arm. The tension arm incorporates pivots along the length thereof. Each pivot can be engaged by or disengaged from the outboard end of one of the spreader arms based on a position of the spreader arm. A linear actuator is used to actuate the joint. This can be realized in several ways, for example as a hoist and cable as shown herein, or with a hoist and tape, or with a threaded rod and nut, but the present disclosure is not limited to these mechanisms to actuate the joint. Herein this linear actuator will be referred to as a hoist and cable system. A hoist, positioned remotely with respect to the module, includes a cable coupled to the second end of the tension arm. The hoist is used to control the position of the spreader arms to thereby control the position of the rigid arm's tip. Payload lifter/manipulator assemblies can be constructed with one or more of the modules supported from a base and a support section mounted to the base.

DETAILED DESCRIPTION OF THE INVENTION

Figure 1:
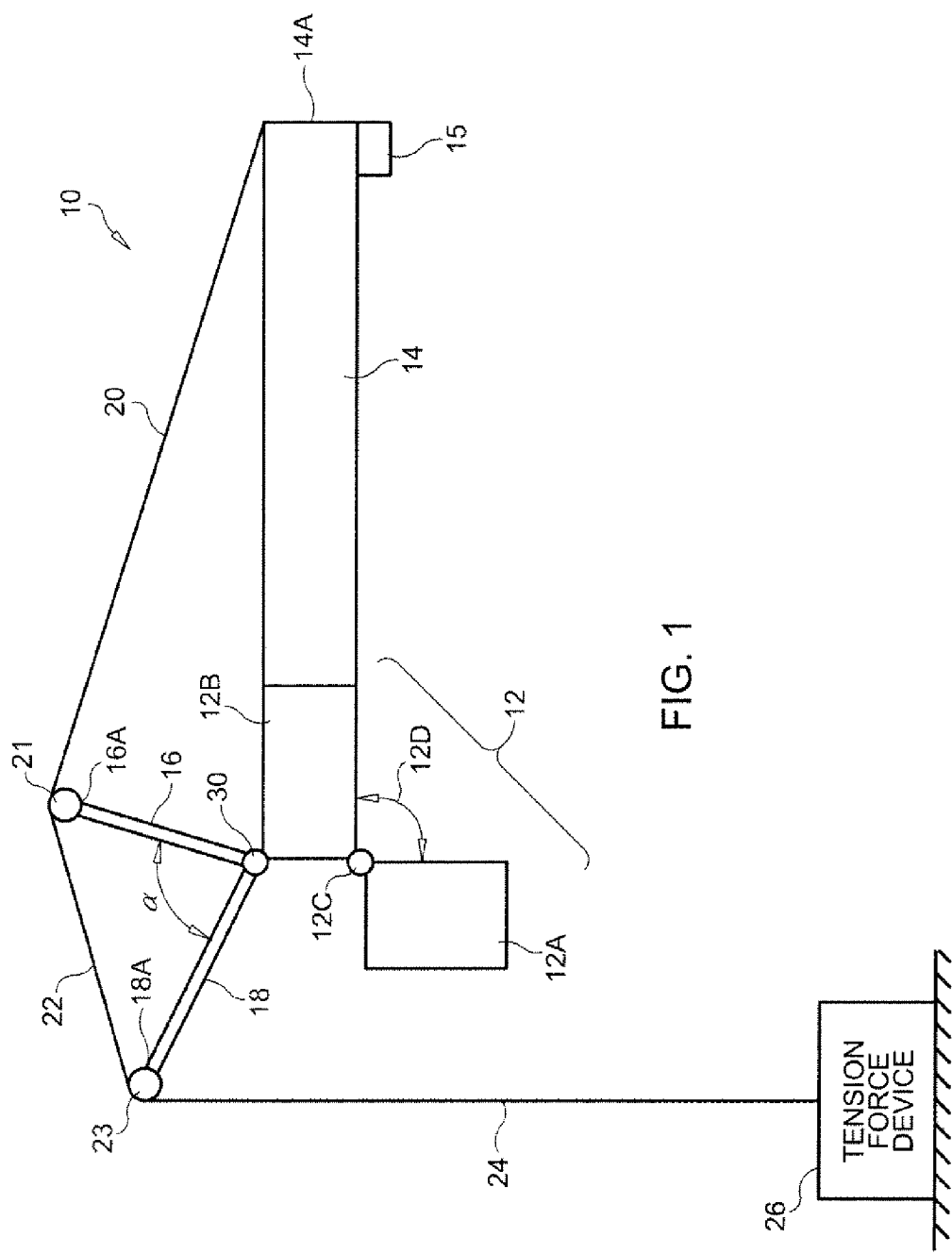
FIG. 1 is an isolated schematic view of a payload lifter/manipulator module in accordance with an embodiment of the present invention.

Referring now to the drawings and more particularly to FIG. 1, a payload lifter/manipulator module in accordance with an embodiment of the present invention is shown and is referenced generally by numeral 10. In general, module 10 is a novel component assembly for use in a variety of larger assemblies that can perform robotic-like movements when lifting and/or manipulating a payload. By way of example, two such larger assembles will be described later below. These larger assemblies utilizing module 10 are ideally suited for lunar or other planetary installations as they are readily configurable for lifting and precisely manipulating a payload. However, the present invention is not limited to these applications as it could also be used for Earth-based operations.

At the heart of payload lifter/manipulator module 10 is a joint 12 that includes first and second mounts 12A and 12B, respectively, rotatably coupled together by a hinge 12C that allows mounts 12A and 12B to rotate in a plane (i.e., plane of the paper in the illustration) as indicated by arrow 12D. Mount 12A is rigidly coupled to a "support" (not shown) that, as will be illustrated in the examples later herein, can be a fixed support or another module 10 without departing from the scope of the present invention. Rigidly coupled to mount 12B is a rigid arm 14 that undergoes compression during operation of module 10. Arm 14 extends out to tip 14A thereof. As will be explained later below, tip 14A can serve as the mounting location for another module 10 (not shown) or can have a payload holding device 15 (e.g., hook, grabber arm, bucket, scoop, platform, electromagnet, etc.) coupled thereto or incorporated therewith. The particular construction of joint 12 and arm 14 are not limitations of the present invention. Arm 14 can be solid, hollow. constructed as a truss, etc., without departing from the scope of the present invention.

Module 10 includes a novel assembly to control the position of tip 14A and any module or payload coupled thereto. The assembly provides precise control of tip 14A over a wide range of movement, thereby allowing module 10 to perform both macro lifting operations and micro manipulating operations. The novel assembly in the illustrated embodiment includes two rigid spreader arms 16 and 18, and a series of tension members 20, 22, and 24 coupled to a tension force device 26.

Spreader arms 16 and 18 are coupled to joint 12 (e.g., at mount 12B) with an operational angle α being defined therebetween. Each of spreader arms 16 and 18 has an outboard end 16A and 18A, respectively, designed to cooperate with a coupling between the above-noted tension members. More specifically, outboard end 16A cooperates with a coupling 21 linking tension members 20 and 22, while outboard end 18A cooperates with a coupling 23 linking tension members 22 and 24. Spreader arms 16 and 18 can be coupled to one another at a hinge 30 so that angle α can vary when couplings 21 and/or 23 are disengaged from a respective one of outboard ends 16A and ISA.

Tension members 20 and 22 are fixed-length rigid members with the lengths thereof being fixed prior to operation of module 10. However, each of tension members 20 and 22 can incorporate a length adjustment feature (e.g., removable section, turnbuckle, etc.) that allows the lengths thereof to be adjusted prior to use of module 10.

Tension member 24 is a variable-length member with the length thereof (i.e., length between coupling 23 and tension force device 26) being altered by device 26 during operation of module 10. By way of example, tension force device 26 can be a motorized hoist that pays out/retrieves a cable coupled to and forming part of tension member 24.

In the present invention, each combination of outboard end 16A/coupling 21 and outboard end 18A/coupling 23 is configured for engagement or disengagement based on the position of the corresponding spreader arm 16 and 18 as controlled by tension force device 26. For example, if tension force device 26 is operated to increase the length of tension member 24, tip 14A is lowered as spreader arms 16 and 18 rotate clockwise with joint 12. Once spreader arm 16 rotates through a certain/specified angle, coupling 21 disengages or "lifts off" outboard end 16A thereby providing additional range of motion for tip 14A. Coupling 21 is re-engaged with outboard end 16A upon a reduction in the length of tension member 24. A similar disengagement or "lift off" will then occur between coupling 23 and outboard end 18A when the length of tension member 24 is further reduced.

Figure 2:
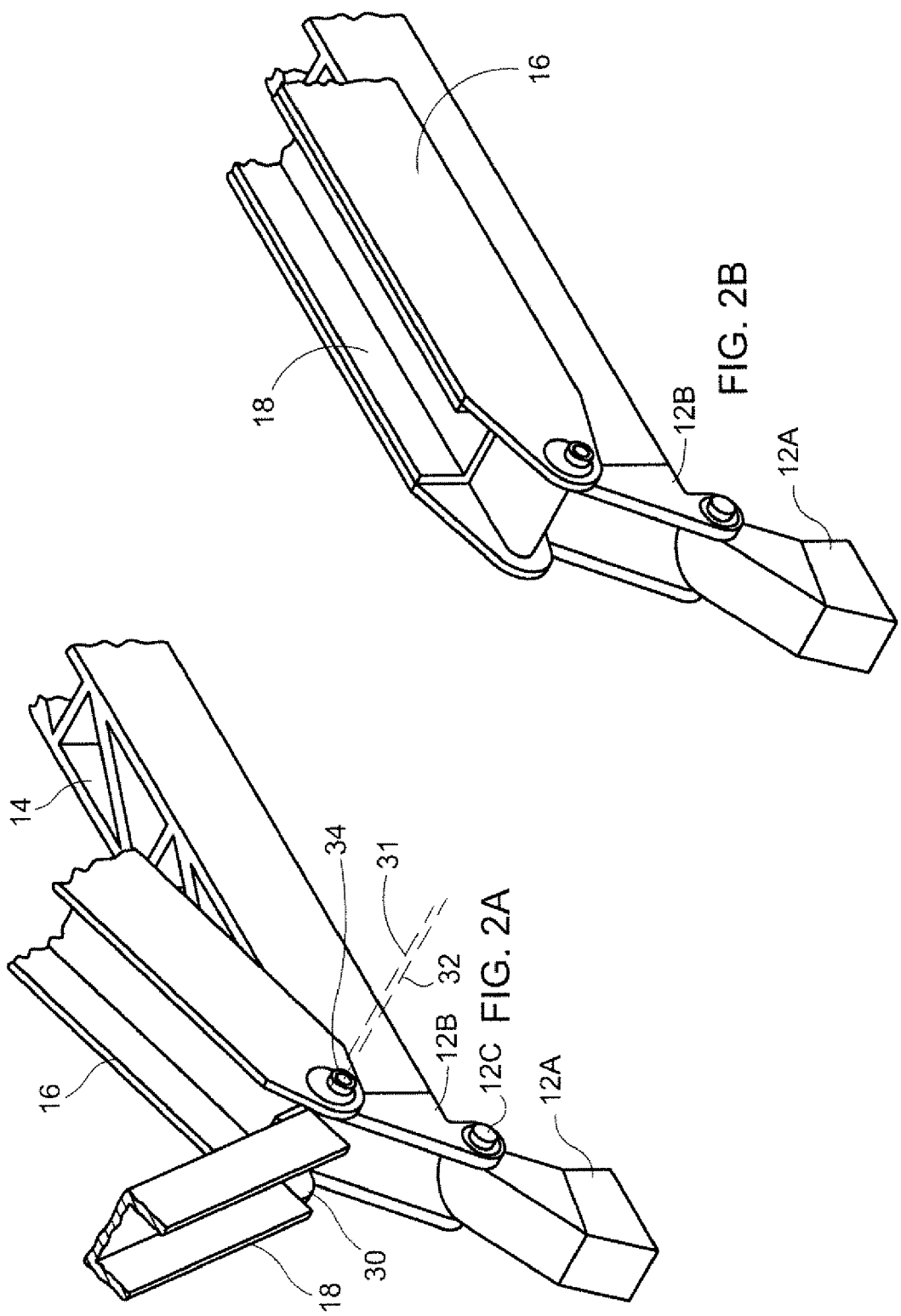
FIGS. 2A and 2B are isometric views of an embodiment of a rotatable joint used in a module of the present invention with spreader arms 16 and 18 in deployed and stowed positions, respectively.

As mentioned above, joint 12 can be realized by a variety of constructions without departing from the scope of the present invention. By way of example, one construction of joint 12 is illustrated in isolation in FIGS. 2A and 2B. In this illustrated version of joint 12, hinge 12C (between mounts 12A and 12B) is offset from hinge 30 (between spreader arms 16 and 18). This offset hinge arrangement allows the various arms, supports or members coupled to joint 12 to be collapsed for compact storage, handling or transportation. Additionally spreader arm 18 rotates about an axis 31 raised above spreader arm 16 axis of rotation 32. Spreader arm 16 rotates about spreader pin 34 directly. FIG. 2A illustrates the spreader arms 16 and 18 in their deployed positions and FIG. 2B illustrates them in their stowed positions.

Figure 3:
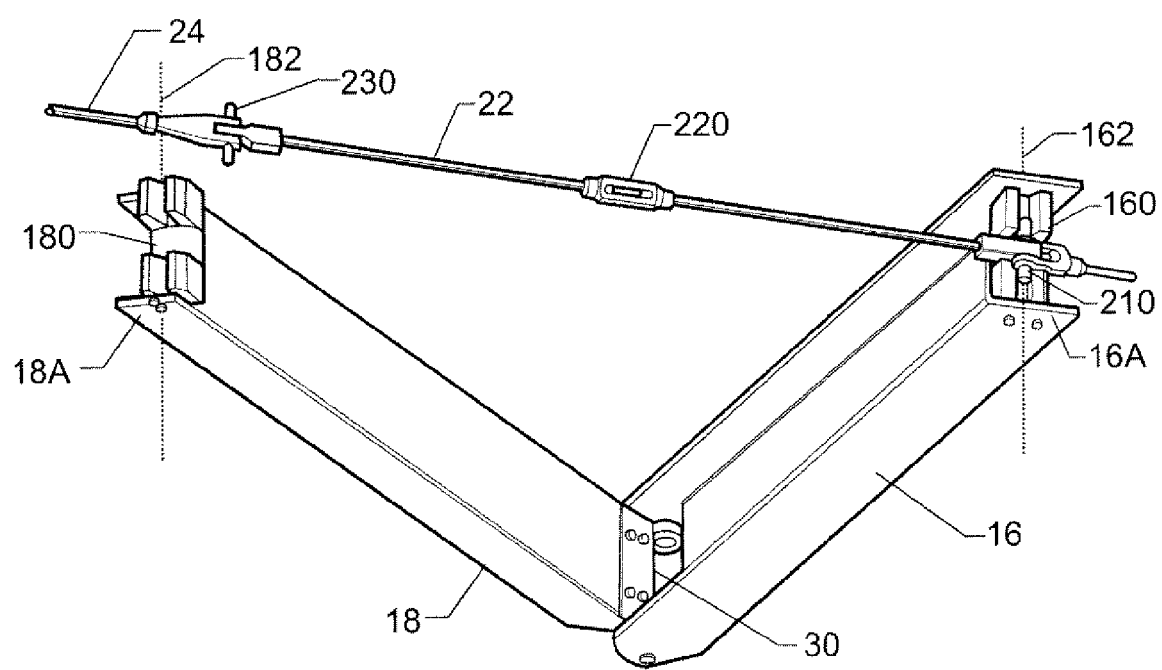
FIG. 3 is an isolated perspective view of the module's two spreader arms.

Spreader arms 16 and 18 (as well as their corresponding outboard ends 16A and 18A and associated couplings 21 and 23) can also be realized by a variety of constructions without departing from the scope of the present invention. By way of example, one possible construction of these elements is illustrated in isolation in FIG. 3. Spreader arm 16 is constructed as an I-beam and spreader arm 18 is constructed as a C-channel sized to nest with spreader arm 16 when rotated together via hinge 30 as best seen in the stowed position illustrated in FIG. 2B. The outboard ends 16A and 18A are formed with an open-channel 160 and 180 that can be aligned with a neutral axis 162 and 182, respectively, of spreader arms 16 and 18. Although not required, aligning a spreader arm's open channel with a neutral axis of the spreader arm prevents bending forces from being introduced into the spreader arm when the coupling coupling 21 or 23) is engaged. Open channel 160 engages or disengages from a clevis pin 210 (i.e., pin 210 forms coupling 21 in this embodiment) based on the position of the spreader arms 16. Clevis pin 210 pivotally couples tension member 20 to tension member 22. In a similar fashion, open-channel 180 engages or disengages from a clevis pin 230 (i.e., pin 230 forms coupling 23 in this embodiment) based on the position of spreader arm 18. Clevis pin 230 pivotally couples tension member 22 to tension member 24. Note that tension member 22 can include an adjustable length feature (e.g., a turnbuckle 220) to accommodate different angular relationships between spreader arms 16 and 18.

Figure 4:
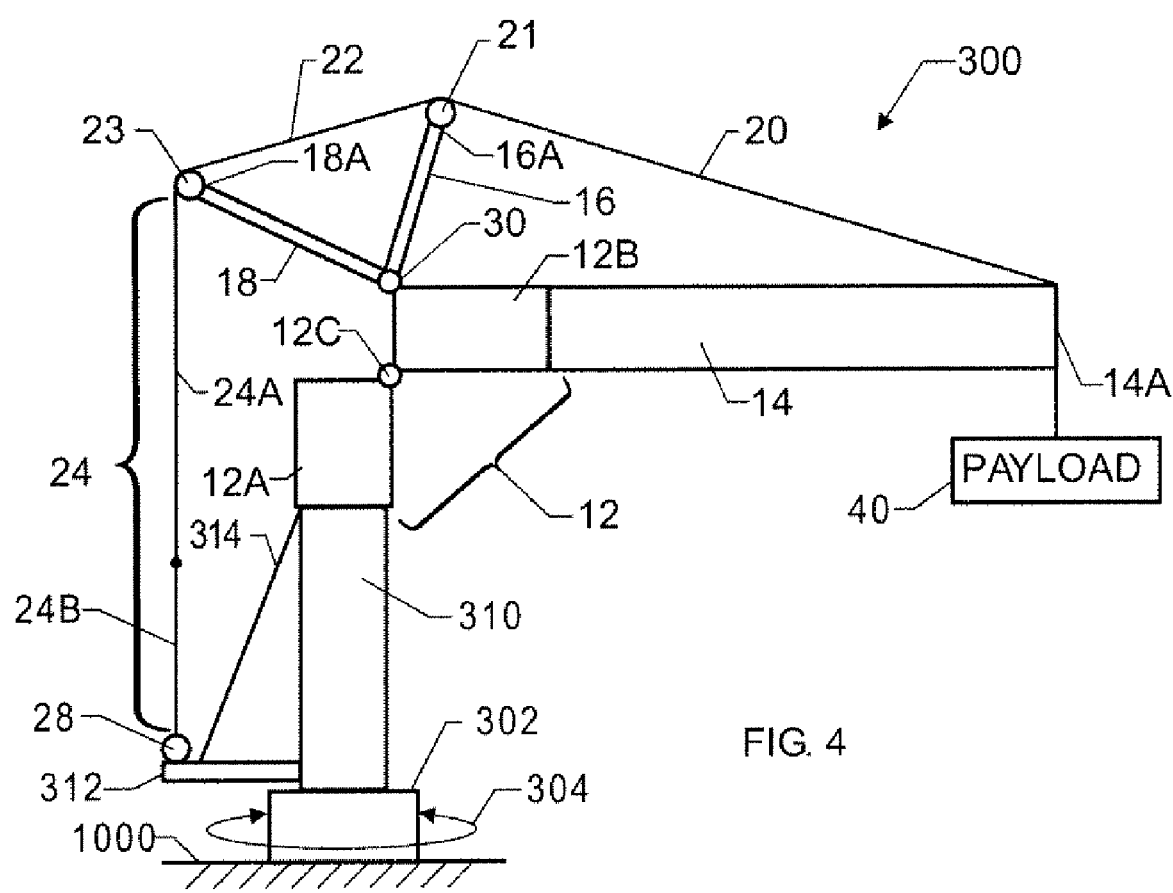
FIG. 4 is a schematic view of a payload lifter/manipulator using a single lifter/manipulator module in accordance with an embodiment of the present invention.

The above described payload lifter/manipulator module can be utilized by a variety of lifting/manipulating assemblies without departing from the scope of the present invention. For example, as shown in FIG. 4, an embodiment of a payload lifter/manipulator ("PLM") using the above-described module is shown and is referenced generally by numeral 300. PLM 300 includes a base 302 that can either be attached to or movable along a surface region 1000 (e.g., ground, man-made platform, vehicle, etc.). Base 302 can be configured for rotation in a plane that is typically substantially parallel to surface region 1000. Such planar rotation of base 302 is indicated by two-headed arrow 304. As would be understood in the art, base 302 can include a leveling mechanism (not shown) if necessary.

Mounted to base 302 is a module support defined by a triangular truss that is formed by rigid members 310, 312, and 314. Member 310 is coupled to base 302 and extends therefrom to mount 12A of joint 12. Member 312 extends radially out from base 302. For example, in the illustrated embodiment, member 312 is perpendicular to member 310. Member 314 couples the outboard ends of members 310 and 312 to complete the triangular truss.

The elements of module 10 included in PLM 300 that are identical to those described above are referenced by the same numerals. In this embodiment of PLM 300, tension member 24 is realized by a rigid rod portion 24A and cable portion 24B that is paid out/retrieved from a motorized hoist 28 mounted on member 312 as shown. In this way, hoist 28 is provided with a mechanical advantage as spreader arms 16 and/or 18 act as lever arms when tip 14A is to be lifted/manipulated. Hoist 28 controls rotation of spreader arms 16/18 and joint 12 in a plane that is typically perpendicular to the rotational plane of base 302. A payload 40 can be coupled to tip 14A in a variety of ways without departing from the scope of the present invention.

Figure 5:
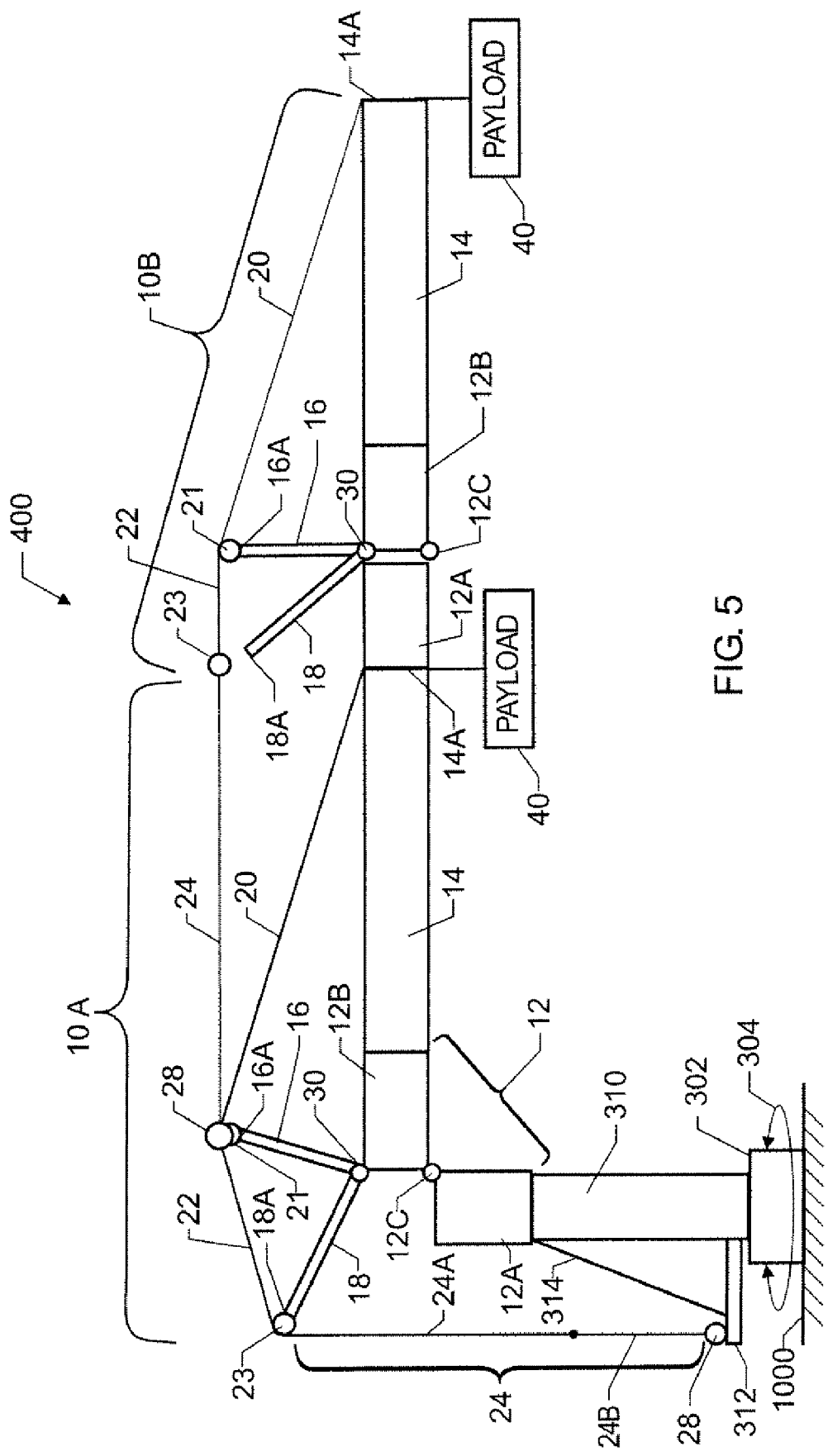
FIG. 5 is a schematic view of a payload lifter/manipulator using two lifter/manipulator modules in accordance with another embodiment of the present invention.

Another example of a lifting/manipulating assembly in accordance with the present invention is shown in FIG. 5 where PLM 400 utilizes a serial arrangement of the previously-described payload lifter/manipulator modules. In the illustrated embodiment, two such modules 10A and 10B are shown. However, it is to be understood that more than two modules could be serially arranged without departing from the scope of the present invention. The elements of PLM 400 that are identical to those in PLM 300 are referenced by the same numerals. Module 10A is coupled to support member 310 as previously described, while the second module 10B is coupled to tip 14A of module 10A. Hoist 28 associated with module 10B is mounted on the outboard end 16A of spreader arm 16 of module 10A. Note that the position of hoist 28 associated with module 10B can be positioned at other locations on module 10A's spreader arm 16 without departing from the scope of the present invention. For example, the relocation of hoist 28 (associated with module 10B) can be used to allow the base portion of the PLM to be lifted/relocated via relocation of the load reaction points. Furthermore, payloads 40 can be coupled to one or both of tips 14A without departing from the scope of the present invention.

Further discussion of the present invention is provided in Doggett, William R.; King, Bruce D.; Jones, Thomas Carno; Dorsey, John T.; Mikulas, Martin M. and Grimes, Michael, "Design and Field Test of a Mass Efficient Crane for Lunar Payload Handling and Inspection: the Lunar Surface Manipulation System," AIAA SPACE 2008 Conference, Sep. 9-11, 2008, San Diego Calif., AIAA paper number 2008-7635; and Doggett, William R.; Dorsey, John T.; Collins, Timothy J.; King, Bruce D.; Mikulas, Martin M., Jr., "A Versatile Lifting Device for Lunar Surface Payload Handling, Inspection and Regolith Transport Operations," Space Technology and Applications International Forum (STAIF 2008), Feb. 10-14, 2008, Albuquerque, N. Mex., AIP Conf. Proc. 969, 792 (2008), the contents of each being hereby incorporated by reference in their entirety.

The advantages of the present invention are numerous. The basic payload lifter/manipulator module is simple and can be incorporated into a variety of assemblies. A serial arrangement of payload lifter/manipulator modules provides a variety of advantages. The range and precision of movement of payloads is increased by the addition of payload coupling locations and the variety of articulated, robotic-like movements provided by the unique spreader arm and tension member engaged and "lift off" relationships. The module-based nature of the present invention permits a variety of PLM constructions.

Although the invention has been described relative to a specific embodiment thereof, there are numerous variations and modifications that will be readily apparent to those skilled in the art in light of the above teachings. For example, although two spreader arms are illustrated for the embodiments described herein, there may be some applications that require the use of only one spreader arm. In addition, a module's joint-rotation-range can be increased by coupling a third or additional spreader arms to a module's joint so that the angle between the outermost spreader arms is greater than angle α described above. It is therefore to be understood that, within the scope of the appended claims, the invention may be practiced other than as specifically described.

What is claimed as new and desired to be secured by Letters Patent of the United States is:

1. A payload lifter/manipulator, comprising:
   a rotatable base adapted to rest on a surface, said base being rotatable in a first plane of rotation;
   a support section coupled to said base and extending upward therefrom to define a mounting location above the surface; and
   a manipulator section pivotally coupled to said support section at said mounting location, said manipulator section having
   a first spreader arm and a second spreader arm coupled to one another at a joint that permits relative planar movement between said first spreader arm and said second spreader arm, said relative planar movement occurring in a second plane perpendicular to said first plane, said joint being pivotally coupled to said support section at said mounting location for independent planar movement that is one of coincident with said second plane and parallel to said second plane,
   each of said first spreader arm and said second spreader arm terminating at an outboard end,
   a rigid arm fixedly coupled to said joint and extending out therefrom to a tip wherein said rigid arm can pivot about said mounting location,
   a tension assembly for increasing the range of motion of said tip, said tension assembly having a first end and a second end with said first end being fixedly coupled to said tip, said tension assembly incorporating a first pivot and a second pivot therealong, said first pivot being operative to be engaged by and disengaged from said outboard end of said first spreader arm based on a position of said first spreader arm, and said second pivot being operative to be engaged by and disengaged from said outboard end of said second spreader arm based on a position of said second spreader arm, and
   a cable deploying/retrieving device mounted on said support section, said device including a cable coupled to said second end of said tension assembly.

2. A payload lifter/manipulator as in claim 1, wherein said support section comprises a truss.

3. A payload lifter/manipulator as in claim 2, wherein said cable deploying/retrieving device is mounted on said truss at a location spaced apart from said base.

4. A payload lifter/manipulator as in claim 1, wherein said first spreader arm and said second spreader arm are configured for nested engagement when rotated together in said second plane at said joint.

5. A payload lifter/manipulator as in claim 1, further comprising means coupled to said tip and adapted to support a payload therefrom.

6. A payload lifter/manipulator as in claim 1, wherein said first pivot transfers loads generated in said tension assembly to a neutral axis of said first spreader arm when said outboard end of said first spreader arm engages said first pivot, and wherein said second pivot transfers toads generated in said tension assembly to a neutral axis of said second spreader arm when said outboard end of said second spreader arm engages said second pivot.

7. A payload lifter/manipulator as in claim 1, wherein said cable deploying/retrieving device is motorized.

8. A payload lifter/manipulator, comprising:
   a rotatable base adapted to rest on a surface;
   a support section coupled to said base and extending upward therefrom to define a mounting location above the surface;
   a serial arrangement of manipulator sections with a first manipulator section coupled to said support section at said mounting location and subsequent ones of said manipulator sections coupled to a corresponding previous one of said manipulator sections, each of said manipulator sections having
   a first spreader arm and a second spreader arm coupled to one another at a joint that permits relative planar movement between said first spreader arm and said second spreader arm,
   each of said first spreader arm and said second spreader arm terminating at an outboard end,
   a rigid arm fixedly coupled to said joint and extending out therefrom to a tip,
   a tension assembly for increasing the range of motion of said tip, said tension assembly having a first end and a second end with said first end being fixedly coupled to said tip, said tension assembly incorporating a first pivot and a second pivot therealong, said first pivot being operative to be engaged by and disengaged from said outboard end of said first spreader arm based on a position of said first spreader arm, and said second pivot being operative to be engaged by and disengaged from said outboard end of said second spreader arm based on a position of said second spreader arm, and a hoist including a cable having an outboard end coupled to said second end of said tension assembly;

said joint associated with said first manipulator section being pivotally coupled to said support section at said mounting location, and said joint associated with each of said subsequent ones of said manipulator sections being pivotally coupled to said tip associated with said corresponding previous one of said manipulator sections; and said hoist associated with said first manipulator section being mounted on said support section, and said hoist associated with each of said subsequent ones of said manipulator sections being mounted on said corresponding previous one of said manipulator sections.

9. A payload lifter/manipulator as in claim 8, wherein said support section comprises a truss.

10. A payload lifter/manipulator as in claim 8 wherein, for each of said manipulator sections, said first spreader arm and said second spreader arm are configured for nested engagement when rotated together at said joint.

11. A payload lifter/manipulator as in claim 8, further comprising means coupled to at least one said tip and adapted to support a payload therefrom.

12. A payload lifter/manipulator as in claim 8 wherein, for each of said manipulator sections, said first pivot transfers loads generated in said tension assembly to a neutral axis of said first spreader arm when said outboard end of said first spreader arm engages said first pivot, and said second pivot transfers loads generated in said tension assembly to a neutral axis of said second spreader arm when said outboard end of said second spreader arm engages said second pivot.

13. A payload lifter/manipulator module, comprising:

a rotatable joint;

at least a first spreader arm and a second spreader arm angularly spaced with respect to one another and coupled to said joint for rotational movement with said joint, each of said first spreader arm and said second spreader arm terminating at an outboard end;

a rigid arm fixedly coupled to said joint and extending out therefrom to a tip wherein said rigid arm is rotatable with said joint;

a tension assembly for increasing the range of motion of said tip, said tension assembly having a first end and a second end with said first end being fixedly coupled to said tip, said tension assembly incorporating a first pivot and a second pivot therealong, said first pivot being operative to be engaged by and disengaged from said outboard end of said first spreader arm based on a position of said first spreader arm, and said second pivot being operative to be engaged by and disengaged from said outboard end of said second spreader arm based on a position of said second spreader arm; and a hoist adapted to be positioned remotely with respect to said module, said hoist including a cable coupled to said second end of said tension assembly.

14. A payload lifter/manipulator module as in claim 13, wherein said first spreader arm and said second spreader arm are rotationally coupled to one another at said joint.

15. A payload lifter/manipulator module as in claim 14, wherein said first spreader arm and said second spreader arm are configured for nested engagement when rotated together.

16. A payload lifter/manipulator module as in claim 13, further comprising means coupled to said tip and adapted to support a payload therefrom.

17. A payload lifter/manipulator module as in claim 13, wherein said first pivot transfers loads generated in said tension assembly to a neutral axis of said first spreader arm when said outboard end of said first spreader arm engages said first pivot, and wherein said second pivot transfers loads generated in said tension assembly to a neutral axis of said second spreader arm when said outboard end of said second spreader arm engages said second pivot.

18. A payload lifter/manipulator module as in claim 13, wherein said hoist is motorized.

* * * * *